United States Patent [19] [11] 3,939,594
Wagner [45] Feb. 24, 1976

[54] FISH LINE HOLDER

[76] Inventor: Lawrence R. Wagner, 7843 E. 49th St., Tulsa, Okla. 74145

[22] Filed: Aug. 12, 1974

[21] Appl. No.: 496,383

[52] U.S. Cl. .............................. 43/42.49; 24/136 B
[51] Int. Cl.² ........................................ A01K 85/00
[58] Field of Search ............ 43/44.95, 42.49, 44.92, 43/44.85, 44.86, 8; 24/249 WL, 263, 136 L, 136 B

[56] References Cited
UNITED STATES PATENTS
3,628,221  12/1971  Pasbrig ............................ 24/136 B
FOREIGN PATENTS OR APPLICATIONS
617,867  11/1926  France ............................ 24/136 B Primary Examiner—Louis G. Mancene
Assistant Examiner—Peter K. Skiff
Attorney, Agent, or Firm—Head and Johnson

[57] ABSTRACT

A fish line holder comprising a housing having an internal cavity with a pair of parallel tapering walls into which a wedge is fitted. The wedge has a plurality of rollers along one edge, and a spring which forces it toward the narrow end of the tapering cavity. There is an opening at the small end of the housing, leading into the cavity into which can be positioned a fishing line or cord, usually a monofiliment line. After the cord is inserted in the space between the wedge and the wall of the cavity, the force of the spring pressing the wedge makes it possible to grip the cord. A release rod is inserted in the side of the wedge, which extends to the outside of the housing through a slot which is parallel to the internal surface on which the rollers run. Pressure on the release rod forces it back against the spring toward the large end of the cavity, thus releasing the grip of the wedge on the cord. Various terminations of the housings at the end opposite said opening can be provided such as a screw, hook, swivel or other means.

18 Claims, 15 Drawing Figures

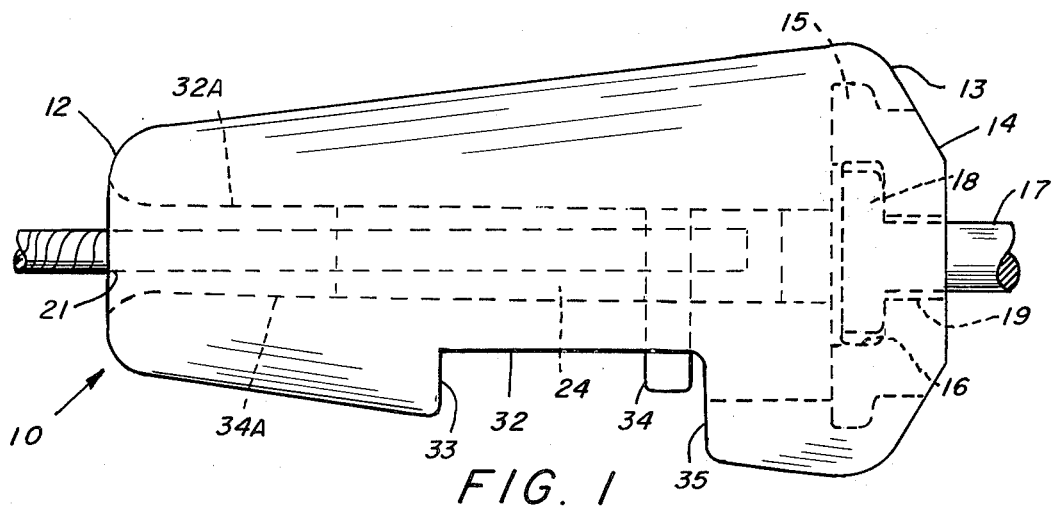
FIG. 1
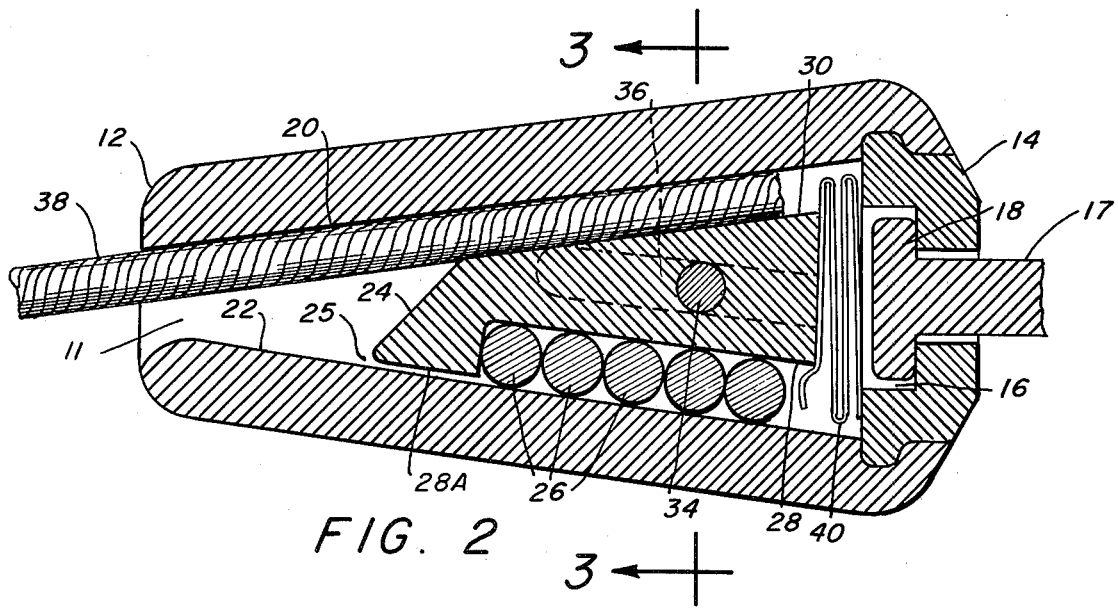
FIG. 2
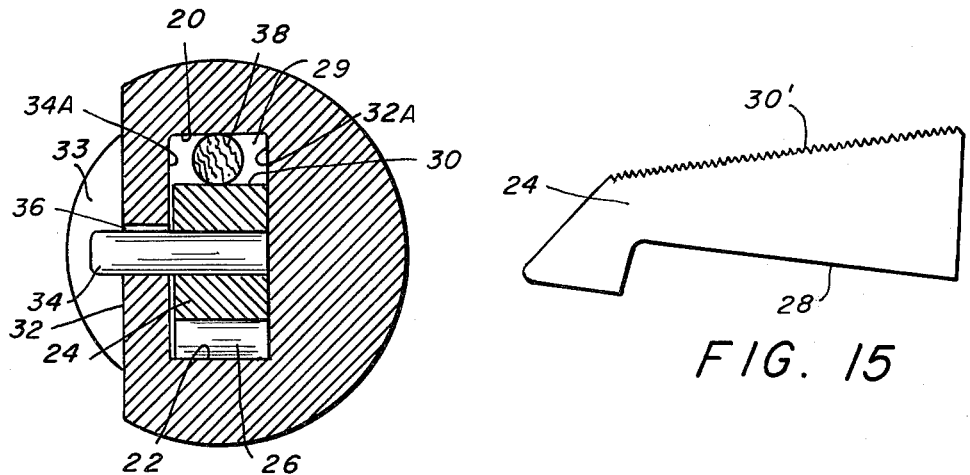
FIG. 3
FIG. 15

FISH LINE HOLDER

BACKGROUND OF THE INVENTION

This invention lies primarily in the field of fishing devices, or in the field of devices for fishermen, although it may be used in other fields of endeavor where small diameter flexible cords or wires are used. This device provides a simple and rapid method of grasping the end of a line or cord, obviating the need of tying a knot in such a line or cord.

In the use of fish lines and other small diameter cords, to attach an appliance such as lures, hooks or other tackle to the cord, it is necessary to thread the cord through a loop or opening in the appliance and to tie a knot in the end of the cord. With very small cords it is difficult to make such knots, particularly under field conditions. Therefore, this device is of considerable value in making quick connections between a cord and a device.

SUMMARY OF THE INVENTION

It is a principal object of this invention to provide a small lightweight device which can be attached to a fixture such as lures, hooks or other tackle for fishing or for quickly removably attaching cords to other devices.

The line holder of this invention comprises an elongated housing, which may be of generally tapering construction. The interior cavity of the housing is of rectangular cross-section. There are two parallel walls of selected spacing. The other two walls are at right angles to the first pair of parallel walls, but are not parallel to each other, but taper from one end of the housing toward the other end. There is a wedge inserted into this cavity, the wedge being of a thickness slightly less than the space between the parallel walls. The wedge is of the same angle of taper as the cavity. Means are provided along one edge of the wedge to provide a plurality of rollers which are adapted to freely roll along one of the tapering walls of the cavity. The second edge of the wedge is parallel to the second tapering wall of the cavity. Spring means are provided for urging the tapered wedge to the small end, where the second edge of the wedge makes contact with the second tapering wall of the cavity. Means are provided, such as by a release rod, to pull back the wedge toward the larger end of the cavity, thus creating a space between the second edge of the wedge and the second tapering wall. A string or cord of small diameter can be inserted through the open small end of the cavity into the space between the second edge of the wedge and the second tapering wall. When the release rod is released the spring forces the wedge toward the small end, securely compressing the cord or rod between the second edge of the wedge and the tapering wall and securely holding the cord or rod or wire to the housing.

At the large end of the housing there is a plug which forms a wall to close the cavity. Means are provided to hold this plug in the end of the housing. The plug may have attached to it a solid wire extension or a hook, clip, screw or other fastening means. Alternatively, a wire or small rod with a head may be positioned in a bored out portion of the plug so as to rotate in the header and act as a swivel connection.

Alternate means of retracting the tapered wedge are provided by means of a small gear wheel inserted into a machined cavity in the wall of the housing. The small gear wheel engages on its inner side, a rack cut into a sidewall of the wedge. The opposite side of the gear extends beyond the outer surface of the housing. By moving the finger across the outer surface of the gear it can be rotated about a short axle pressed into the housing, to move the wedge inwardly or outwardly in the tapered cavity.

BRIEF DESCRIPTION OF THE DRAWINGS

These and other objects and advantages of this invention and a better understanding of the principles and details of the invention will be evident from the following description taken in conjunction with the appended drawings, in which:

FIGS. 1, 2 and 3 illustrate respectively an outside view of the device of this invention, a cross-section parallel to the plane of the wedge and a cross-section transverse to the axis of the housing.

FIG. 15 shows an alternate arrangement of the tapered wedge in which the surface which engages the cord is irregular to insure increased frictional contact with the cord.

DESCRIPTION OF THE PREFERRED EMBODIMENT

Figure 7:
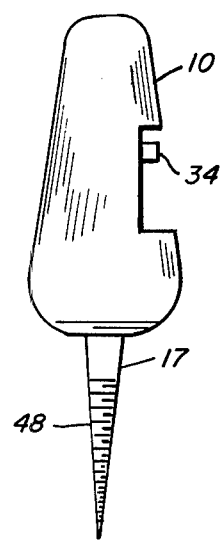

Referring now to the drawings and in particular to FIGS. 1, 2 and 3, there is shown an outside view, partly in dashed line, of one embodiment of this invention. The overall view of the fish line holder is indicated generally by the numeral 10. It comprises a circular housing which may be tapered and have a small end 12 and a large end 13. There is an internal space or cavity 11, inside of the housing which has a rectangular cross section as clearly shown in FIG. 3. There are two parallel walls 32A and 34A and there are two tapering walls 20 and 22. The small end 12 of the housing has an opening 21. The large end of the housing is closed by a plug 14 which fits into a circular cut in the end of the housing of diameter comparable to that of the flange 15 of the plug. The plug 14 may have an extension in the form of a screw such as indicated in FIG. 7 or extensions in other desired forms. Preferably, it has a central opening 19 and a counter bore 16 so that a rod 17 with head 18 can be inserted into the opening 19, which will act as a swivel in the plug 14.

Inside of the internal space or cavity 11 is a tapered wedge 24 which has a taper between its two surfaces 30 and 28 which is of the same angle as the tapered walls 20 and 22 of the cavity. The wall 28 is adapted to roll on a plurality of rollers 26 or its wall may be an extension of the parallel wall 28A. The wedge can be moved from the large end toward the small end of the cavity. Eventually it will reach a point where the rollers contact the wall 22 and the surface 30 of the wedge contacts the surface 20 of the cavity. The wedge has a release or retrieval means, by which it can be moved from the small end to the large end. One form of release means comprises a rod 34 which is inserted into the side of the wedge. The rod 34 extends to the outside of the housing through a slot 36 which is parallel to the surface 22 of the cavity. Thus, by grasping the rod 34 the wedge can be moved longitudinally inside of the cavity. A compression spring 40 is placed in the cavity between the wedge and the plug 14, so that the wedge is continually urged toward the small end of the cavity. After the wedge and rollers are inserted into the cavity the spring is placed in position and the plug is positioned into the counter bore at the end of the housing. Then the end of the housing is spun over the plug 14, grasping the flange 15 and locking the plug in place.

If a rod or cord 38 (most commonly in the form of a monofiliment line) is now inserted into the opening 21 in the small end 12, the cord or rod will move into the space 29 between the surfaces 30 and 20 into the position shown in FIGS. 2 and 3. The spring 40 will exert a force tending to drive the wedge to the left and it will securely grasp the cord or rod or wire 38 and prevent its removal. It will be clear that after the cord is wedged into the space 11, between surfaces 30 and 20, any force tending to pull the cord out will cause the wedge to be moved to the left and will more securely clamp the cord.

As shown in FIG. 15, it is desirable to provide a roughened finish on the surface 30', so as to provide irregular convolutions that will dig into and hold the cord 38, so that as a tensile force is applied it will securely lock the cord to the wedge and cause the wedge to close even tighter, as the cord 38 is pulled. If desired, a flat surface 32 can be machined on the side of the housing so that the release rod 34 will project beyond the surface 32 so that it can be grasped and pulled back to release the rod or cord 38.

Referring now to FIGS. 4, 5, 6, 7 and 8, there are various configurations of the housing indicated in FIGS. 1, 2 and 3. Each of these housings are similar in internal construction to the drawings of FIGS. 1, 2 and 3. However, the rod 17 which is swiveled by its head 18 into the header 14 can be of various designs providing an opening through which a spring clip or snap swivel 44 can be inserted so that a fish line inserted into the holder 10 can rotate with respect to the snap connector 44.

It will be obvious, because of the tapered nature of the wedge that cords or rods of various diameters can be inserted into and locked in position in the space 29. However, because of the limited range of longitudinal motion of the wedge it may be necessary to have holders designed with different size wedges for different ranges of size of cords.

Figure 4:
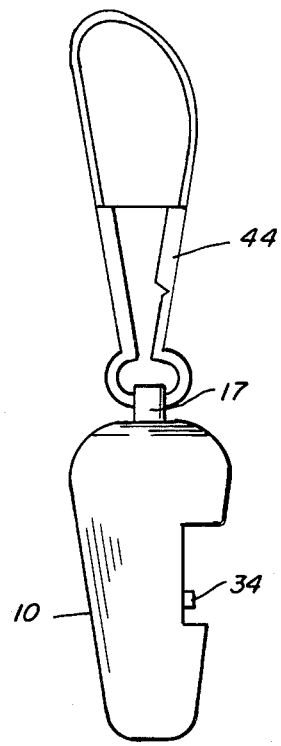
FIGS. 4, 5, 6, 7 and 8 indicate variations of the manner of use of the device of this invention.
Figure 5:
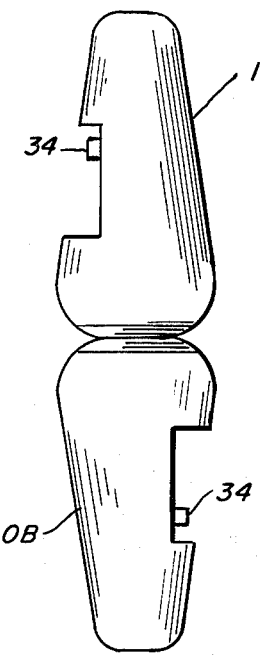

FIG. 5 illustrates the use of two holders, back to back. These can be rigidly connected, or they can be rotatable, or swiveled, with respect to each other. Instead of having the two holders 10A and 10B rigidly fastened together they can be separated by a short length of rod 17 swiveling on one or both of the housings 10A and 10B or the rod 17 can be flexible.

Figure 6:
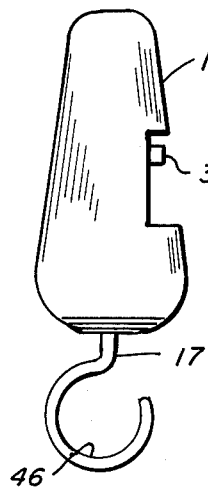

FIG. 6 indicates a model in which the rod 16 is in the form of an open hook to which can be attached to another device and the hook closed. This provides an easy fastening between the holder and the device.

Figure 8:
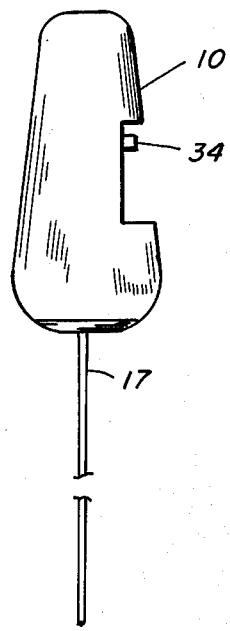
Figure 9:
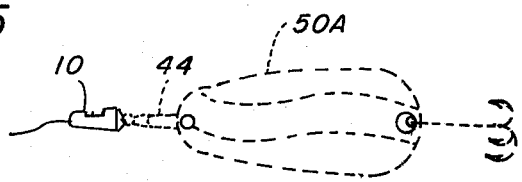
FIGS. 9, 10, 11 and 12 illustrate further uses of the device of this invention in conjunction with various types of fishermen's tackle.
Figure 10:
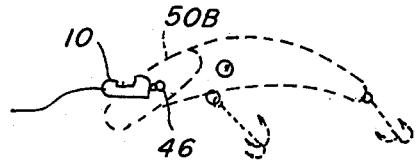
Figure 11:
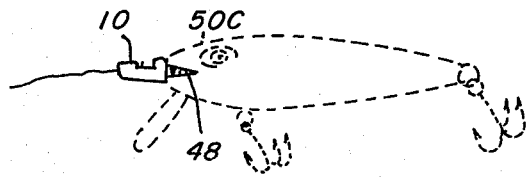
Figure 12:
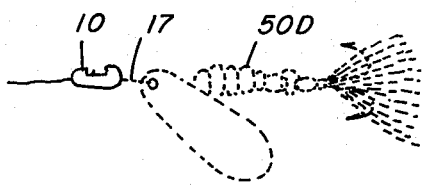

FIG. 7 indicates the construction in which the header 14 includes as an integral part a rod-like tapering screw 48 for attachment to a device. FIG. 8 indicates still another embodiment in which the rod 17 is of a long form, to which can be attached a device such as that indicated in FIG. 12.

FIGS. 9, 10, 11 and 12 illustrate the use of the embodiments of FIGS. 4, 6, 7 and 8 respectively and need no further explanation.

Figure 13:
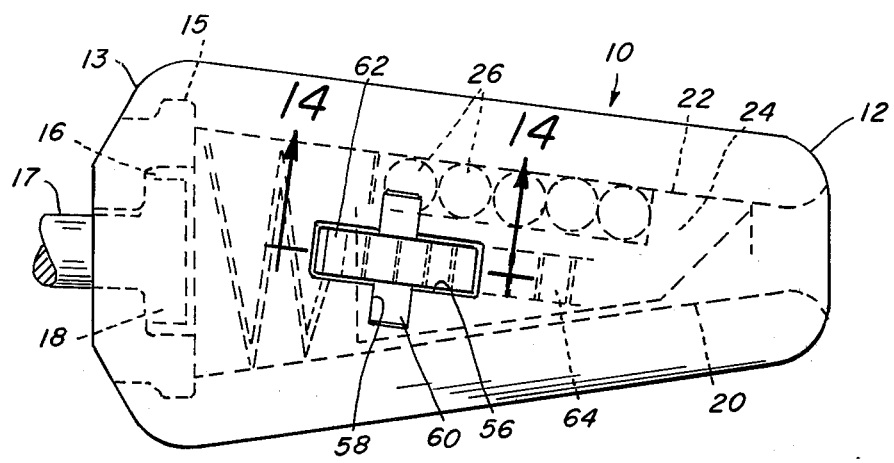
FIGS. 13 and 14 illustrate two views of the device of this invention having an alternate means of externally controlling the position of the wedge inside of the housing.
Figure 14:
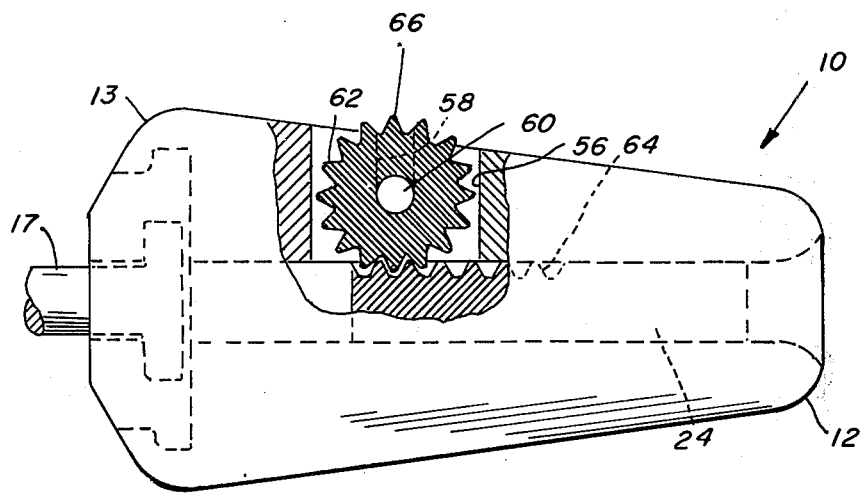

Referring now to FIGS. 13 and 14, there is shown another embodiment having a different type of release means than the rod 34. This is in the form of a gear wheel 62 which is positioned in an opening of rectangular shape having walls 56. There is a cross opening, with walls 58 into which a short shaft can be pressed. There is clearance between the gear and its walls 56, but the shaft 60 is a tight press fit into its opening 58. The gear is adapted to run freely on the shaft 60. The plane of the gear is parallel to the internal surface 22 of the cavity.

On the wall of the wedge there is cut a rack 64, with which the gear wheel 62 can mesh. The outer diameter of the gear 62 is such that a portion 66 projects out beyond the outer surface of the housing, so that by movement of a finger across the tips 66 the gear wheel 62 it can be rotated about the shaft 60 and by engaging the rack 64 with the teeth of the gear the wedge can be moved longitudinally within the housing. This is equivalent to the use of the rod 34 operating in the slot 36 but appears to offer additional advantages.

While the device has been described as an adjunct to fishermen's tackle of various types and for use with small diameter fishing line, etc., this is by no means a limiting use and it can be utilized in many types of applications where a quick connection is desired between a rod or cord or wire to an attachment. The simple release control provides immediate disengagment and engagement between the cords and the holder.

On wall 22 of the internal cavity is desired to be of low coefficient of friction with the wedge surface 28A or the rollers 26. This can conveniently be done by coating these surfaces with Teflon or similar material as is well known in the art. The other walls 30 of the wedge and 20 of the cavity are desired to be roughened or have a high coefficient of friction. There are many ways in which this can be done as is well known in the art.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A quick grasp and release line holder comprising:
   a housing having an integral cavity, the cavity being defined by a rectangular cross section formed of first and second parallel side walls and a top and bottom which are tapered towards each other with a selected angle therebetween, the small end of said cavity opening to the oustide of said housing, the housing having a slot opening therein parallel the cavity bottom surface, the opening intersecting one of said side walls;
   a tapered wedge inside said cavity, said wedge having parallel side surfaces spaced apart by a dimension less than the spacing between said first and second side walls of said cavity, and tapered top and bottom edges, the angle of taper of the edges being the same as the angle of taper of said top and bottom cavity walls;

spring means urging said wedge toward the small end of said cavity; and a member connected to one side of said wedge extending through said housing side opening to retract said wedge against the force of said spring toward the large end of said cavity to permit the insertion of a line through the open end of said housing and between said cavity top surface and said wedge top edge.

2. The holder as in claim 1 including means to fasten the end of said housing opposite to said open end to a selected device.

3. The holder as in claim 2 in which said means to fasten includes swivel means.

4. The holder as in claim 1 in which one of said top surface of said wedge and said top surface of said cavity is roughened to provide a high coefficient of friction to securely grasp a fishline inserted therebetween.

5. A holder according to claim 1 including a plurality of rollers positioned between said wedge bottom edge and said cavity bottom surface.

6. The holder as in claim 1 including a second holder, and means to attach said two holders together at the ends opposite to their open ends.

7. The holder as in claim 6 in which said two holders are rigidly attached together.

8. The holder as in claim 6 in which said two holders are rotatably attached together.

9. The holder as in claim 1 in which said housing is externally tapered in toward the open end of said cavity.

10. A quick grasp and release liner holder comprising:

a housing having an integral cavity, the cavity being defined by a rectangular cross section formed of first and second parallel side walls and a top and bottom which are tapered towards each other with a selected angle therebetween, the small end of said cavity opening to the outside of said housing, the housing having a side opening therein intersecting said first cavity side wall;

a tapered wedge inside said cavity, said wedge having parallel side surfaces spaced apart by a dimension less than the spacing between said first and second side walls of said cavity, and tapered top and bottom edges, the angle of taper of the edges being the same as the angle of taper of said top and bottom cavity walls, the side surface of the wedge facing said first cavity side wall having rack means thereon;

spring means to urge said wedge toward the small end of said cavity; and a rotatable gear means in said housing side opening engaging said rack means to retract said wedge against the force of said spring toward the large end of said cavity to permit the insertion of a line through the open end of said housing and between said cavity top surface and said wedge top edge.

11. The holder as in claim 10 including means to fasten the end of said housing opposite to said open end to a selected device.

12. The holder as in claim 10 in which said means to fasten includes swivel means.

13. The holder as in claim 10 including a second holder, and means to attach said two holders together at the ends opposite to their open ends.

14. The holder as in claim 13 in which said two holders are rigidly attached together.

15. The holder as in claim 13 in which said two holders are rotatably attached together.

16. The holder as in claim 10 in which said housing is externally tapered in toward the open end of said cavity.

17. The holder as in claim 10 in which one of said top surfaces of said wedge and said top surface of said cavity is roughened to provide a high coefficient of friction to securely grasp a fishline inserted therebetween.

18. A holder according to claim 10 including a plurality of rollers positioned between said wedge bottom edge and said cavity bottom surface.

* * * * *